United States Patent
Lin et al.

(10) Patent No.: US 11,420,706 B2
(45) Date of Patent: Aug. 23, 2022

(54) STEM AND BICYCLE

(71) Applicant: Gogoro Inc., Wanchai (HK)

(72) Inventors: Hsun-Hsueh Lin, Taoyuan (TW); Ting-Ping Ku, Taoyuan (TW); Yu-Hua Chen, Taoyuan (TW); Liang-Yi Hsu, Taoyuan (TW)

(73) Assignee: Gogoro Inc., Wanchai (HK)

( * ) Notice: Subject to any disclaimer, the term of this patent is extended or adjusted under 35 U.S.C. 154(b) by 0 days.

(21) Appl. No.: 17/193,020

(22) Filed: Mar. 5, 2021

(65) Prior Publication Data

US 2021/0276657 A1    Sep. 9, 2021

Related U.S. Application Data

(60) Provisional application No. 62/986,114, filed on Mar. 6, 2020.

(51) Int. Cl.
*B62K 21/12* (2006.01)
*B62K 21/18* (2006.01)
(Continued)

(52) U.S. Cl.
CPC ............. *B62K 21/24* (2013.01); *B62J 11/00* (2013.01); *B62K 19/40* (2013.01); *B62K 21/12* (2013.01); *B62K 21/125* (2013.01); *B62K 21/18* (2013.01)

(58) Field of Classification Search
CPC ...... B62K 21/12; B62K 21/125; B62K 21/16; B62K 21/18; B62K 21/22; B62K 21/24; B62K 19/40; B62J 11/00
See application file for complete search history.

(56) References Cited

U.S. PATENT DOCUMENTS 5,437,208 A * 8/1995 Cheng ............... B62K 21/12
280/279
5,477,747 A * 12/1995 Cheng ............... B62K 21/12
280/279

(Continued)

FOREIGN PATENT DOCUMENTS

CN    208181324 U    12/2018
CN    111846055 A  * 10/2020
(Continued)

OTHER PUBLICATIONS

Machine translation of DE 202016100990 U1 obtained on Jun. 15, 2021.*

(Continued)

*Primary Examiner* — Adam D Rogers
(74) *Attorney, Agent, or Firm* — McCormick, Paulding & Huber PLLC (57) ABSTRACT

A stem includes a stem body, a column and a locking device. The stem body is provided with a perforation. The column is disposed at one end of the stem body and provided with a first aperture, the perforation is in communication with the first aperture. The locking device is disposed in the perforation and includes a clamping part, two sliding blocks and a first fixing member, the clamping part is located between the sliding blocks, and the first fixing member penetrates the clamping part and the sliding blocks. When the first fixing member moves toward the inside of the perforation, the first fixing member drives the sliding blocks to approach each other and squeeze the clamping part, such that the clamping part moves in a direction toward the first aperture. According to this, the assembly and disassembly procedures of the present invention are quite simple and easy to operate.

17 Claims, 12 Drawing Sheets

(51) Int. Cl.
    *B62K 21/24*    (2006.01)
    *B62J 11/00*    (2020.01)
    *B62K 19/40*    (2006.01)

(56) References Cited

U.S. PATENT DOCUMENTS

| | | | | |
|---|---|---|---|---|
| 5,536,102 | A * | 7/1996 | Kao | B62K 21/12 |
| | | | | 403/320 |
| 5,971,415 | A * | 10/1999 | Lin | B62K 21/06 |
| | | | | 280/280 |
| 6,309,135 | B1 * | 10/2001 | Thomson | B62K 21/12 |
| | | | | 403/344 |
| 6,711,966 | B2 * | 3/2004 | Chuang | B62J 11/00 |
| | | | | 403/308 |
| 9,357,044 | B1 * | 5/2016 | Scully | B62K 21/12 |
| 9,663,179 | B2 * | 5/2017 | Wagner | B62K 21/12 |
| 10,953,948 | B2 * | 3/2021 | Vandermolen | B62K 19/32 |
| D920,174 | S * | 5/2021 | Lin | D12/118 |
| 2003/0140727 | A1 | 7/2003 | Chuang et al. | |
| 2004/0183273 | A1 * | 9/2004 | French | B62K 21/18 |
| | | | | 280/280 |
| 2016/0107717 | A1 | 4/2016 | Chen | |
| 2017/0233029 | A1 * | 8/2017 | Li | B62K 21/18 |
| | | | | 74/551.1 |
| 2018/0334217 | A1 * | 11/2018 | Li | B62K 21/22 |
| 2019/0367121 | A1 | 12/2019 | Vandermolen et al. | |
| 2021/0062841 | A1 * | 3/2021 | Li | F16B 2/065 |

FOREIGN PATENT DOCUMENTS

| | | | | |
|---|---|---|---|---|
| DE | 202016100990 U1 * | 3/2016 | | B62K 21/18 |
| DE | 202017103316 U1 * | 6/2017 | | B62K 21/16 |
| DE | 20 2018 100 678 U1 | 2/2018 | | |
| DE | 202018104595 U1 * | 11/2018 | | B62J 11/13 |
| TW | 251551 | 7/1995 | | |
| TW | 570008 | 1/2004 | | |
| TW | M405401 U | 6/2011 | | |
| TW | M575425 U | 3/2019 | | |
| TW | M575786 U | 3/2019 | | |

OTHER PUBLICATIONS

Taiwanese Search Report and English Translation for Serial No. 110103110 dated Aug. 2, 2021.
Extended European Search Report for European Patent Application Serial No. 21160746.0 dated Jul. 14, 2021.
Chinese examination report for patent application No. 2021102543680 dated Mar. 22, 2022 along with English translation.
Taiwanese examination report for patent application No. 110103110 dated Mar. 28, 2022 along with English translation.

* cited by examiner

STEM AND BICYCLE

CROSS-REFERENCE TO RELATED APPLICATION

This application claims the priority of US provisional application No. 62/986,114, filed on Mar. 6, 2020, which is incorporated herewith by reference.

BACKGROUND OF THE INVENTION

1. Field of the Invention

The present invention relates to a stem and a bicycle, and more particularly, to a stem for mounting a handlebar and being fixed to a steering tube, and a bicycle including the stem.

2. The Prior Arts

As cycling has become more and more popular, riders bring bicycles to certain destinations according to life needs, travel or competition and other situations. In order to avoid the bicycle size being too large to be brought to public transportation or other transportation means, the riders usually simply disassemble the bicycle, take it to the destination, and then reassemble the bicycle at the destination. Therefore, the convenience of assembling the bicycle has become a very important issue.

Generally, the steering assembly of a bicycle includes a steering tube, a stem and a handlebar. The steering tube is rotatably disposed on the bicycle body. The steering tube is fixed at one end of the stem by a plurality of fixing members, and the handlebar is fixed at another end of the stem by a plurality of fixing members. Common accessories for bicycles can also be fixed on the stem by a plurality of fixing members. This kind of steering assembly has several problems as follows: first, the assembly and disassembly procedures are quite complicated and difficult to operate; second, there are too many parts, such that after being detached from the steering tube, the parts are difficult to store and easy to lose; third, the locking surface, the opening of the hole on locking surface, and the head portion of the fixing member are exposed at the top of the stem, which lacks the aesthetic feeling.

SUMMARY OF THE INVENTION

The main objective of the present invention is to provide a stem, wherein the steering tube can be fixed by a locking device. Therefore, the assembly and disassembly procedures are quite simple and easy to operate.

Another objective of the present invention is to provide a stem, wherein there are only a few number of parts. Therefore, after being detached from the steering tube, the parts are easy to store and not easy to lose.

Yet another objective of the present invention is to provide a stem, wherein since the locking surface, the hole on the locking surface and the head portion of the fixing member are all located at the bottom of the fixing part. Therefore, the user cannot see the locking surface, the hole on the locking surface and the head portion of the fixing member when standing, thereby improving the aesthetic feeling of the stem.

Still another objective of the present invention is to provide a bicycle, which has all the effects of the above-mentioned stem.

In order to achieve the above-mentioned objectives, the present invention provides a stem, which includes a stem body, a column and a locking device. The stem body is provided with a perforation. The column is disposed at one end of the stem body and provided with a first aperture, the perforation is in communication with the first aperture. The locking device is disposed in the perforation and includes a clamping part, two sliding blocks and a first fixing member, the clamping part is located between the sliding blocks, and the first fixing member penetrates the clamping part and the sliding blocks. Wherein, when the first fixing member moves toward the inside of the perforation, the first fixing member drives the sliding blocks to approach each other and squeeze the clamping part, such that the clamping part moves in a direction toward the first aperture.

In an embodiment, each sliding block has a side that faces the other sliding block and each of the facing sides forms a squeezing surface, respectively; the clamping part has two sides that form a contact surface; and the contact surfaces abut against the squeezing surfaces, respectively.

In an embodiment, each of sides of the sliding blocks facing each other forms a squeezing surface, respectively; each of both sides of the clamping part forms a contact surface, respectively; and the contact surfaces abut against the squeezing surfaces, respectively.

In an embodiment, extending directions of the squeezing surfaces are different from each other, and a distance between the squeezing surfaces increases in the direction toward the first aperture.

Preferably, at least one of the squeezing surfaces is an inclined surface or an arc surface.

Preferably, the squeezing surfaces are both inclined surfaces or arc surfaces.

In an embodiment, extending directions of the contact surfaces are different from each other, and a distance between the contact surfaces increases in the direction toward the first aperture.

Preferably, at least one of the contact surfaces is an inclined surface or an arc surface.

Preferably, the contact surfaces are both inclined surfaces or arc surfaces.

In an embodiment, extending directions of the squeezing surfaces are different from each other, and a distance between the squeezing surfaces increases in the direction toward the first aperture; the squeezing surfaces are both inclined surfaces or arc surfaces; extending directions of the contact surfaces are different from each other, and a distance between the contact surfaces increases in the direction toward the first aperture; the contact surfaces are both inclined surfaces or arc surfaces; and shapes of the squeezing surfaces match the shapes of the contact surfaces, respectively.

In an embodiment, a first engaging portion is disposed on an inner sidewall of the first aperture, and the first engaging portion is used for engaging a second engaging portion of an accessory in the first aperture.

Preferably, the first engaging portion is closer to an opening at a top of the first aperture than to an opening at a bottom of the first aperture.

Preferably, the accessory is provided with a base, a shape of the base matches a shape of an opening at a top of the first aperture, and the second engaging portion is disposed on an outer sidewall of the base.

In an embodiment, a cross-section of the perforation is non-circular, a cross-section of each of the sliding blocks is non-circular, and a shape of each of the sliding blocks is the same as a shape of the perforation.

In an embodiment, a side of the clamping part facing the first aperture is recessed inwardly to form an arc surface.

In an embodiment, the sliding blocks are respectively defined as a first sliding block and a second sliding block; the first fixing member is a bolt; and the first fixing member sequentially passes through the first sliding block and the clamping part and is fastened into the second sliding block.

In an embodiment, the sliding blocks are respectively defined as a first sliding block and a second sliding block; the first fixing member includes a head portion and a rod portion; the rod portion sequentially passes through the first sliding block and the clamping part and is fixed into the second sliding block; and the locking device further includes a gasket ring sleeved at the rod portion and abutting against the first sliding block and the head portion.

In an embodiment, one end of the perforation is an open end, and another end of the perforation is a closed end.

In an embodiment, the stem further comprises a supporting structure including an extension part, a fixing part and at least one second fixing member; the extension part is disposed at another end of the stem body and at least one fixing hole is disposed at a bottom of the extension part; the fixing part is provided with at least one through hole penetrating the fixing part; an axis of the at least one fixing hole is coaxial with an axis of the at least one through hole and is perpendicular to a length direction of the stem body; and the at least one second fixing member passes through the at least one through hole and is fixed into the at least one fixing hole, such that the fixing part is fixed below the extension part.

In order to achieve the above-mentioned objectives, the present invention provides a bicycle, which includes a bicycle body and a steering assembly. The steering assembly includes a steering tube, a stem and a handlebar. The steering tube is rotatably disposed on the bicycle body. The stem includes a stem body, a column, a locking device and a supporting structure; the stem body is provided with a perforation; the column is disposed at one end of the stem body and provided with a first aperture, the perforation is in communication with the first aperture; the column is sleeved at the steering tube such that the steering tube is located in the first aperture; the locking device is disposed in the perforation and includes a clamping part, two sliding blocks and a first fixing member, the clamping part is located between the sliding blocks, and the first fixing member penetrates the clamping part and the sliding blocks; and the supporting structure is disposed at the other end of the stem body; wherein, when the first fixing member moves toward the inside of the perforation, the first fixing member drives the sliding blocks to approach each other and squeeze the clamping part, such that the clamping part moves in a direction toward the first aperture, the clamping part thereby squeezes the steering tube such that the steering tube is fixed in the first aperture. A handlebar is disposed in the supporting structure.

In an embodiment, the supporting structure includes an extension part, a fixing part and at least one second fixing member; wherein the extension part is disposed at the other end of the stem body and at least one fixing hole is disposed at a bottom of the extension part; the fixing part is provided with at least one through hole penetrating the fixing part; an axis of the at least one fixing hole is coaxial with an axis of the at least one through hole and is perpendicular to a length direction of the stem body; and the at least one second fixing member passes through the at least one through hole and is fixed into the at least one fixing hole, such that the fixing part is fixed below the extension part; and the fixing part and the extension part jointly fix the handlebar.

The present invention is advantageous in that as long as the user places the locking device in the perforation and uses a tool to rotate the first fixing member, the clamping part can fix the steering tube in the first aperture, or the steering tube can be detached from the first aperture. Therefore, the assembly and disassembly procedures are quite simple and easy to operate.

In addition, as long as the locking device includes four basic components such as the two sliding blocks, the clamping part and the first fixing member, the steering tube can be fixed in the first aperture. Therefore, since there are only a few number of parts, after being detached from the steering tube, the parts are easy to store and not easy to lose.

Further, since the locking surface at the bottom of the fixing part, the opening of the through hole on the locking surface, and the head portion of the first fixing member are all located at the bottom of the fixing part, the user cannot see the locking surface, the opening of the through hole on the locking surface and the head portion of the first fixing member when standing, thereby improving the aesthetic feeling of the stem.

In addition, in the present invention, since the accessory can be fixed on the column without any fixing member, the assembly and disassembly procedures of the present invention are quite simple and easy to operate.

Further, there is not any locking surface on the column, which improves the aesthetic feeling of the stem.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Hereinafter, a more detailed description of the implementation of the present invention with reference to the drawings and reference symbols, such that those skilled in the art can implement it after studying this written description.

Figure 1:
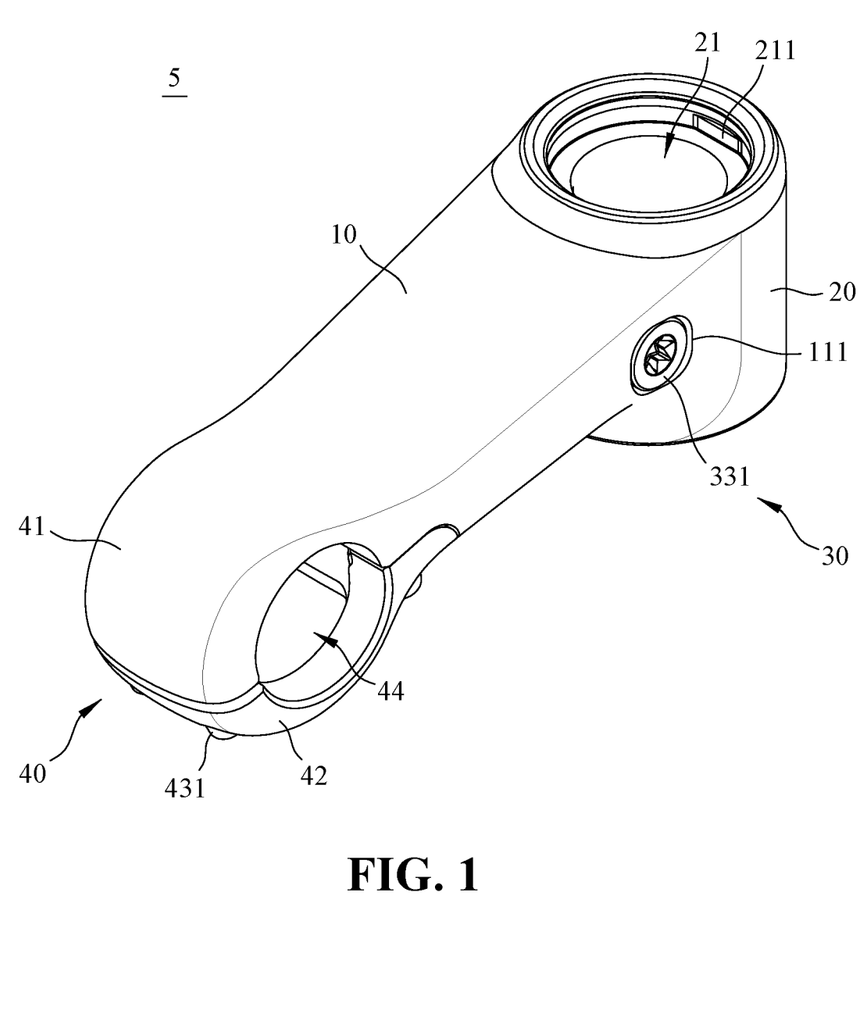
FIG. 1 is a perspective view of the stem of the present invention.
Figure 2:
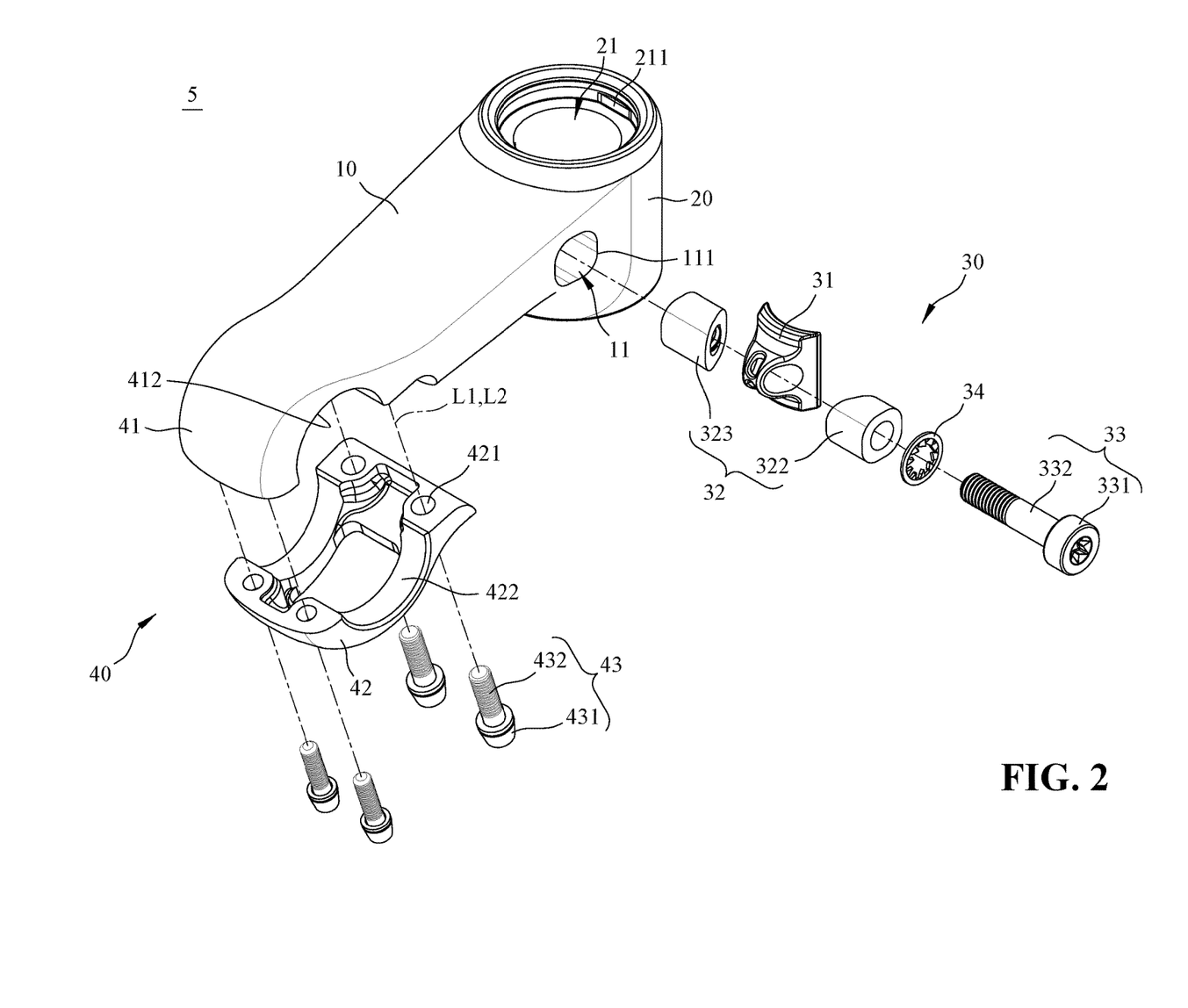
FIG. 2 is an exploded view of the stem of the present invention.
Figure 3:
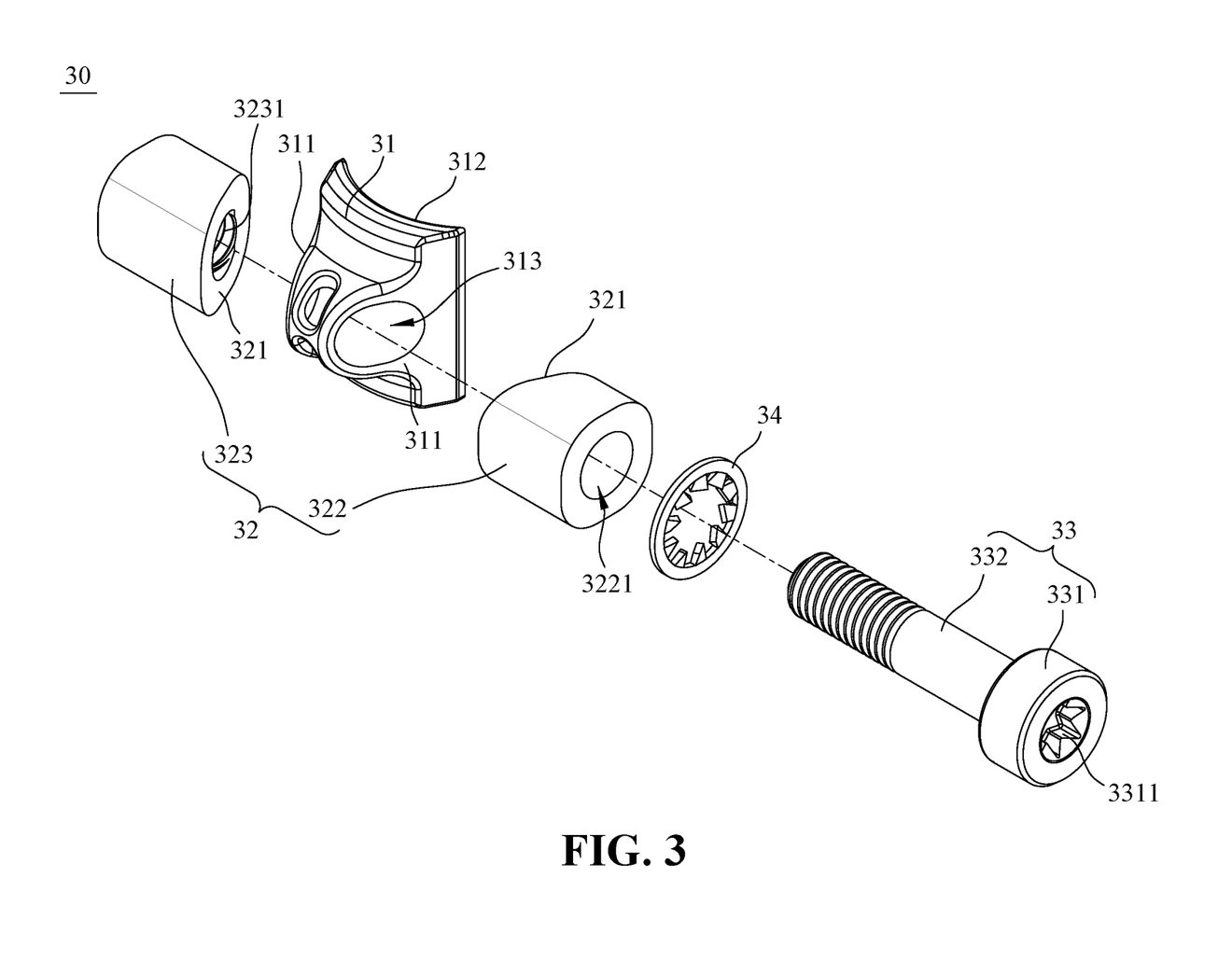
FIG. 3 is a schematic view of the locking device of the present invention.
Figure 4:
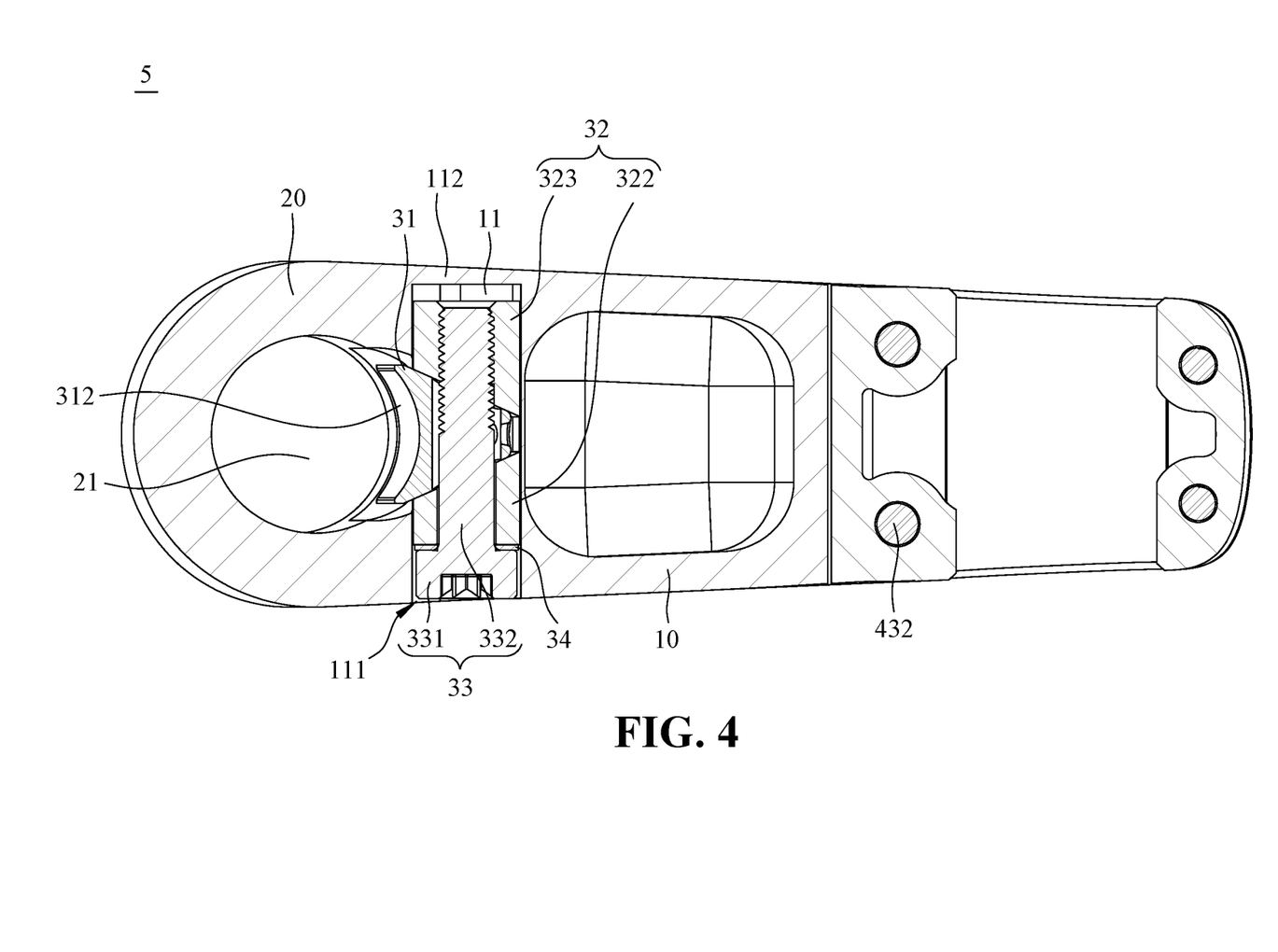
FIG. 4 is a cross-sectional view of the stem of the present invention.
Figure 5:
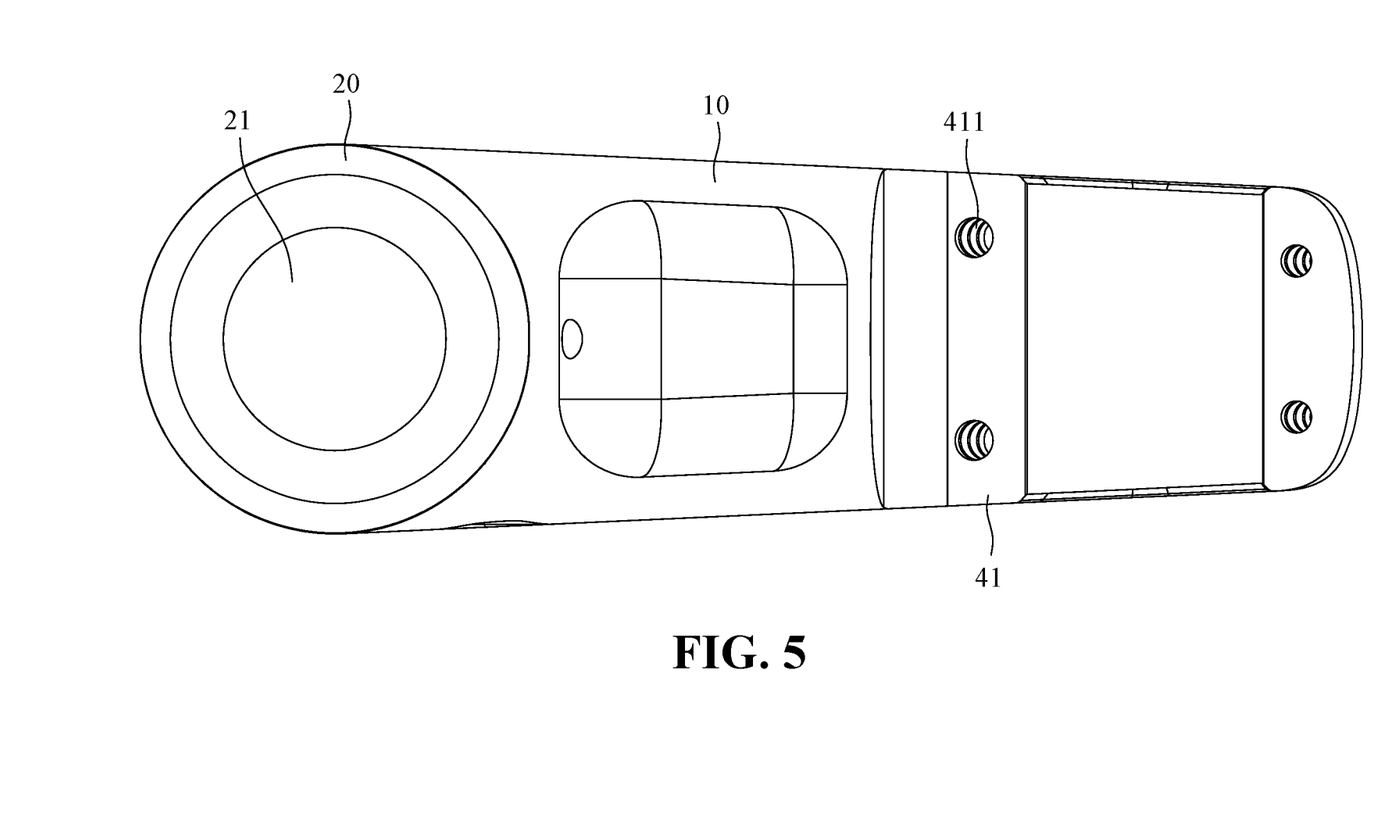
FIG. 5 is a bottom view of the stem body of the stem of the present invention.

FIG. 1 is a perspective view of the stem 5 of the present invention. FIG. 2 is an exploded view of the stem 5 of the present invention. FIG. 3 is a schematic view of the locking device 30 of the present invention. FIG. 4 is a cross-sectional view of the stem 5 of the present invention. FIG. 5 is a bottom view of the stem body 10 of the stem 5 of the present invention. As shown in FIGS. 1 to 5, the present invention provides a stem 5, which includes a stem body 10, a column 20, a locking device 30 and a supporting structure 40. The stem body 10 is a long-bar shape and provided with a perforation 11. The column 20 is integrally formed at one end of the stem body 10 and provided with a first aperture 21. The locking device 30 is disposed in the perforation 11 and includes a clamping part 31, two sliding blocks 32 and a first fixing member 33. The clamping part 31 is located between the sliding blocks 32, and the first fixing member 33 penetrates the clamping part 31 and the sliding blocks 32. The supporting structure 40 is disposed at another end of the stem body 10.

Figure 6:
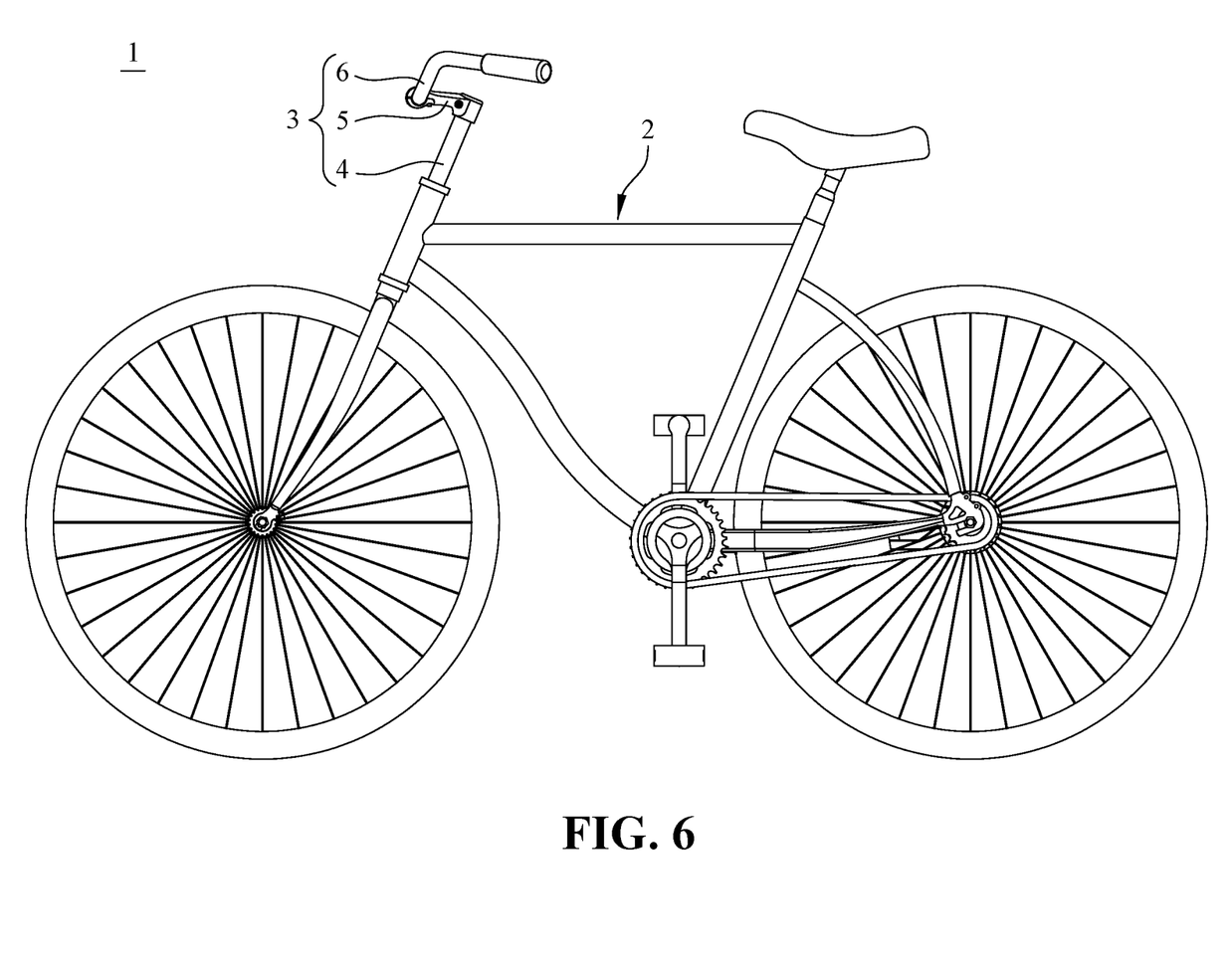
FIG. 6 is a side view of the bicycle of the present invention.
Figure 7:
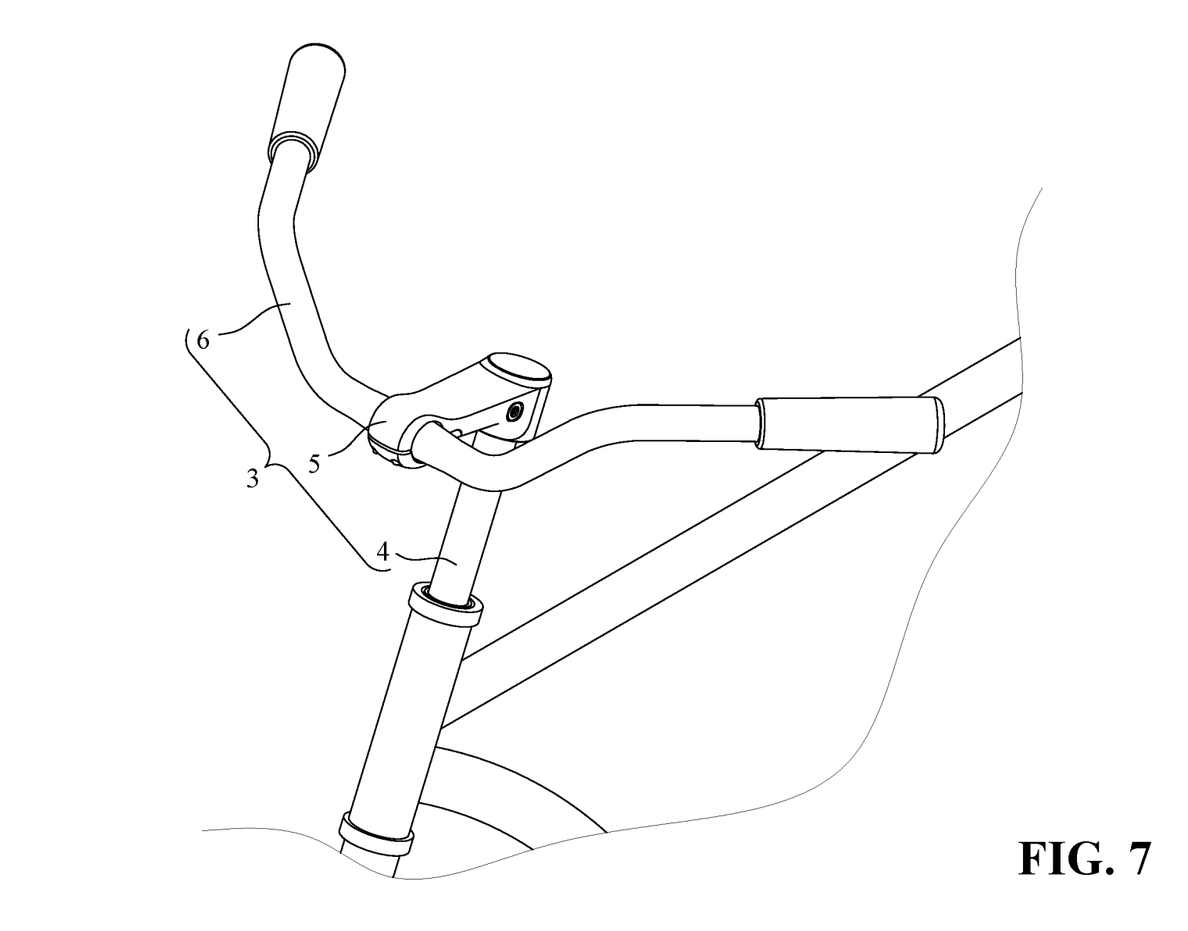
FIG. 7 is a perspective view of the steering assembly of the present invention mounted on the bicycle body.

FIG. 6 is a side view of the bicycle 1 of the present invention. FIG. 7 is a perspective view of the steering assembly 3 of the present invention mounted on the bicycle body 2. As shown in FIGS. 6 and 7, the present invention provides a bicycle 1, which includes a bicycle body 2 and a steering assembly 3. In this embodiment, the bicycle body 2 denotes all components other than the steering assembly 3, and includes at least structures such as frame, head parts, front and rear forks, wheels, saddle, transmission mechanism, shock absorber, derailleur and brake. Since the structure of the bicycle body 2 is well known and is not the spirit of the present invention, which will not be described in detail herein. The steering assembly 3 includes a steering tube 4, the stem 5 and a handlebar 6. The steering tube 4 is rotatably disposed on the bicycle body 2 and disposed at one end of the stem body 10. The handlebar 6 is disposed in the supporting structure 40.

Hereinafter, the assembly method of the present invention and its effect will be explained with the drawings.

Figure 8:
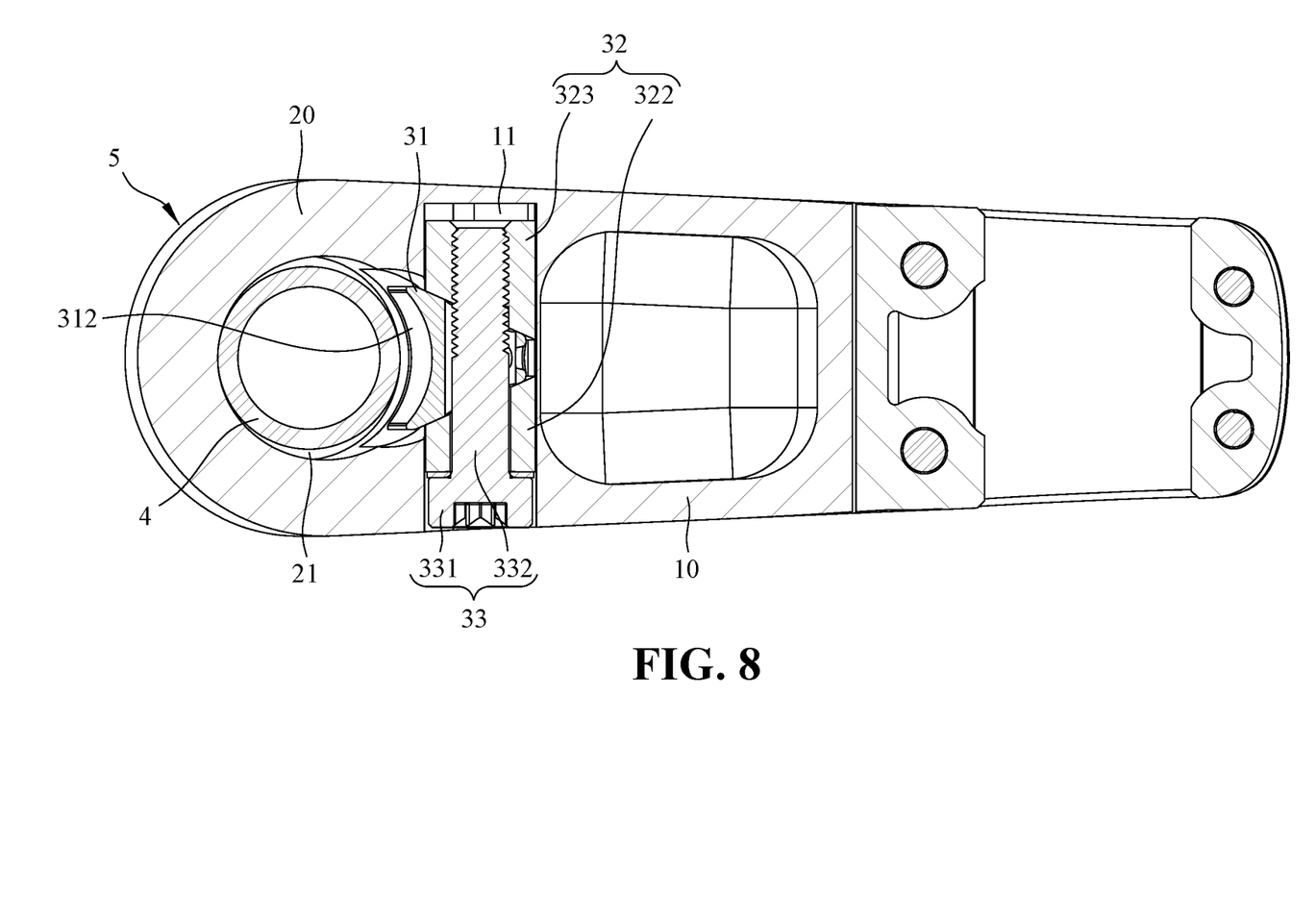
FIG. 8 is a schematic view illustrating the state that the steering tube has not been fixed in the first aperture by the locking device of the present invention.

First, as shown in FIG. 8, the column 20 is sleeved at the steering tube 4 such that the steering tube 4 is located in the first aperture 21. The sliding blocks 32 and the clamping part 31 are sequentially placed into the perforation 11, and the first fixing member 33 is inserted into the sliding blocks 32 and the clamping part 31.

Then, the user uses a tool (not shown) to rotate the first fixing member 33, such that the first fixing member 33 moves toward the inside of the perforation 11.

Figure 9:
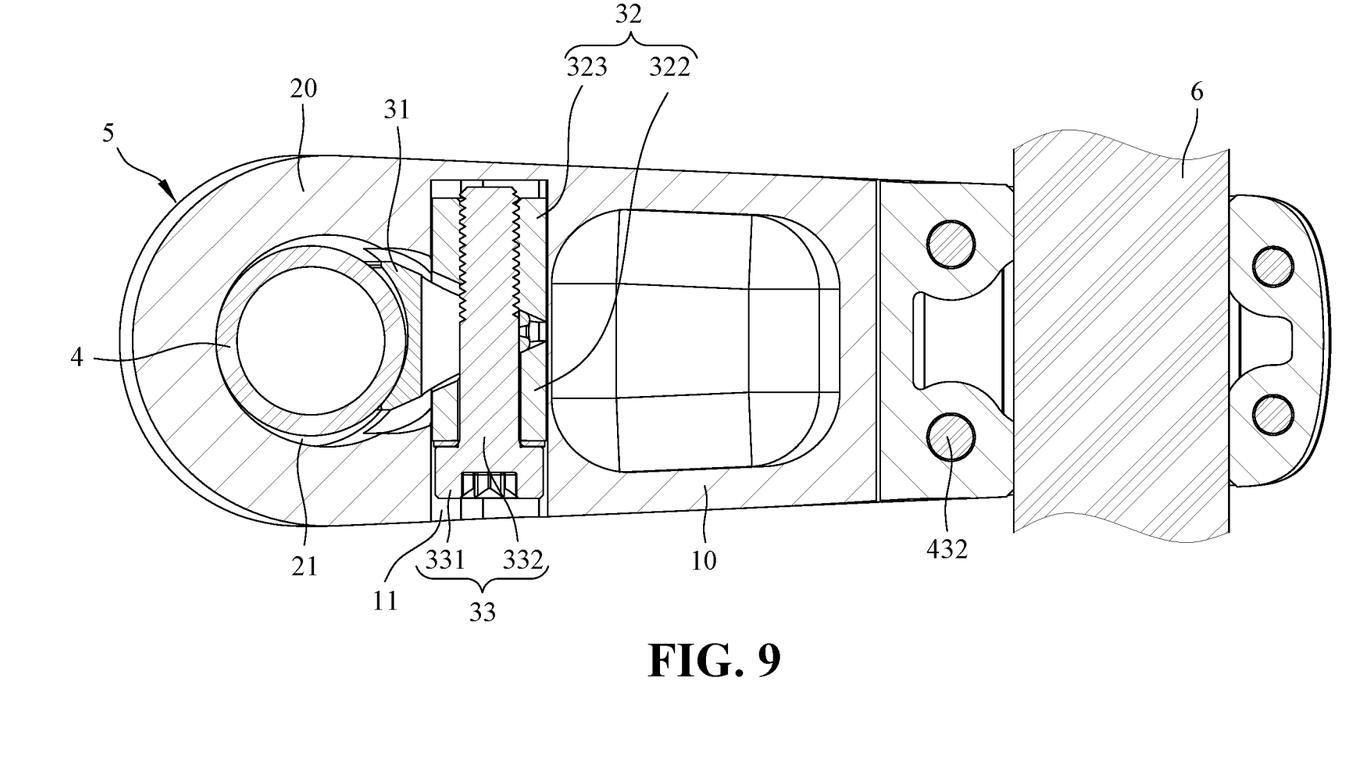
FIG. 9 is a schematic view illustrating the state that the steering tube has been fixed in the first aperture by the locking device of the present invention.

Next, as shown in FIG. 9, when the first fixing member 33 moves toward the inside of the perforation 11, the first fixing member 33 drives the sliding blocks 32 to approach each other and squeeze the clamping part 31, such that the clamping part 31 moves in a direction toward the first aperture 21, the clamping part 31 thereby squeezes the steering tube 4 such that the steering tube 4 is fixed in the first aperture 21.

Finally, as shown in FIG. 9, the handlebar 6 is disposed in the supporting structure 40. Of course, the handlebar 6 can also be disposed in the supporting structure 40 before the steering tube 4 is fixed in the first aperture 21.

In addition, when the user intends to detach the steering assembly 3, he uses the tool to rotate the first fixing member 33, such that the first fixing member 33 moves toward the outside of the perforation 11. When the first fixing member 33 moves toward the outside of the perforation 11, the sliding blocks 32 remains stationary but no longer provide a squeezing force to the clamping part 31, and thus the clamping part 31 no longer provides the squeezing force to the steering tube 4, thereby allowing the steering tube 4 to be detached from the first aperture 21. Therefore, the disassembly procedure is quite simple and easy to operate.

According to this, as long as the user places the locking device 30 in the perforation 11 and uses the tool to rotate the first fixing member 33, the clamping part 31 can fix the steering tube 4 in the first aperture 21, or the steering tube 4 can be detached from the first aperture 21. Therefore, the assembly and disassembly procedures are quite simple and easy to operate.

Further, as long as the locking device 30 includes four basic components such as the two sliding blocks 32, the clamping part 31 and the first fixing member 33, the steering tube 4 can be fixed in the first aperture 21. Therefore, since there are only a few number of parts, after being detached from the steering tube 4, the parts are easy to store and not easy to lose.

In preferred embodiments, as shown in FIG. 3, each sliding block 32 has a side that faces the other sliding block 32 and each of the facing sides forms a squeezing surface 321, respectively; and the clamping part 31 has two sides that form a contact surface 311. As shown in FIG. 4, the sliding blocks 32 and the clamping part 31 are sequentially placed into the perforation 11, and the contact surfaces 311 abut against the squeezing surfaces 321, respectively. As shown in FIG. 9, when the first fixing member 33 moves toward the inside of the perforation 11, the first fixing member 33 drives the sliding blocks 32 to approach each other, the squeezing surfaces 321 gradually approach each other to reduce a distance between the squeezing surfaces 321, and the contact surfaces 311 can slide along the squeezing surfaces 321, such that the clamping part 31 moves in the direction toward the first aperture 21.

In preferred embodiments, as shown in FIGS. 3 and 4, extending directions of the squeezing surfaces 321 are different from each other, and a distance between the squeezing surfaces 321 increases in the direction toward the first aperture 21. As shown in FIG. 9, regardless of shapes of the contact surfaces 311, during the procedure of the squeezing surfaces 321 gradually approaching each other, the contact surfaces 311 can slide along the squeezing surfaces 321, and the clamping part 31 can move linearly in the direction toward the first aperture 21 without shifting, such that the clamping part 31 can accurately squeeze the steering tube 4. Preferably, at least one of the squeezing surfaces 321 is an inclined surface. In other words, as long as one of the squeezing surfaces 321 is an inclined surface, the effect of controlling the clamping part 31 to move linearly toward the first aperture 21 can be achieved. Preferably, the squeezing surfaces 321 are both inclined surfaces, such that the clamping part 31 can move linearly in the direction toward the first aperture 21 more smoothly.

In preferred embodiments, as shown in FIGS. 3 and 4, extending directions of the contact surfaces 311 are different from each other, and a distance between the contact surfaces 311 increases in the direction toward the first aperture 21. As shown in FIG. 9, regardless of shapes of the squeezing surfaces 321, during the procedure of the squeezing surfaces 321 gradually approaching each other, the contact surfaces 311 can slide along the squeezing surfaces 321, and the clamping part 31 can move linearly in the direction toward the first aperture 21 without shifting, such that the clamping part 31 can accurately squeeze the steering tube 4. Preferably, at least one of the contact surfaces 311 is an inclined surface. In other words, as long as one of the contact surfaces 311 is an inclined surface, the effect of controlling the clamping part 31 to move linearly toward the first aperture 21 can be achieved. Preferably, the contact surfaces 311 are both inclined surfaces, and the clamping part 31 can move linearly in the direction toward the first aperture 21 more smoothly.

In most preferred embodiments, as shown in FIGS. 3 and 4, the extending directions of the squeezing surfaces 321 are different from each other, and the distance between the squeezing surfaces 321 increases in the direction toward the first aperture 21; the squeezing surfaces 321 are both inclined surfaces; the extending directions of the contact surfaces 311 are different from each other, and the distance between the contact surfaces 311 increases in the direction toward the first aperture 21; the contact surfaces 311 are both inclined surfaces; and the shapes of the squeezing surfaces 321 match the shapes of the contact surfaces 311, respectively. As shown in FIG. 9, during the procedure of the squeezing surfaces 321 gradually approaching each other, the contact surfaces 311 can slide along the squeezing surfaces 321 most smoothly, and the clamping part 31 can move linearly in the direction toward the first aperture 21 most smoothly without shifting, such that the clamping part 31 can accurately squeeze the steering tube 4, and the wear between the squeezing surfaces 321 and the contact surfaces 311 can also be reduced.

In other embodiments, the same effect can also be achieved by using an arc surface instead of the inclined surface.

Notably, during the rotation of the first fixing member 33, if the sliding blocks 32 are circular and rotate together with the first fixing member 33, the sliding blocks 32 will not be able to slide inside the perforation 11, such that the effect of squeezing the clamping part 31 cannot be achieved, the clamping part 31 thereby cannot squeeze the steering tube 4. Therefore, in preferred embodiments, as shown in FIGS. 3 and 4, a cross-section of the perforation 11 is non-circular, a cross-section of each of the sliding blocks 32 is non-circular, and the shape of each of the sliding blocks 32 is the same as the shape of the perforation 11. In more detail, the cross-section of the perforation 11 is polygonal with rounded corners, the cross-section of each of the sliding blocks 32 is polygonal with rounded corners, and the overall shape of each of the sliding blocks 32 is a wedge shape. Therefore, during the rotation of the first fixing member 33, the sliding blocks 32 will not rotate together with the first fixing member 33, such that the sliding blocks 32 can smoothly slide inside the perforation 11, so as to maintain the effect of squeezing the clamping part 31, thereby maintaining the effect of the clamping part 31 squeezing the steering tube 4.

In preferred embodiments, as shown in FIGS. 3 and 4, a side of the clamping part 31 facing the first aperture 21 is recessed inwardly to form an arc surface 312. As shown in FIG. 9, the arc surface 312 can match a shape of the steering tube 4. According to this, a contact area between the clamping part 31 and a contact surface of the steering tube 4 can be increased by the arc surface 312, and the squeezing force of the clamping part 31 can be evenly distributed to the contact surface of the steering tube 4 by the arc surface 312, thereby improving the effect of the clamping part 31 squeezing the steering tube 4.

In preferred embodiments, as shown in FIGS. 3 and 4, the sliding blocks 32 are respectively defined as a first sliding block 322 and a second sliding block 323; the first fixing member 33 includes a head portion 331 and a rod portion 332; the rod portion 332 has an external thread, therefore the first fixing member 33 is a bolt. The rod portion 332 sequentially passes through a through hole 3221 of the first sliding block 322 and a through hole 313 of the clamping part 31 and is fastened into a threaded hole 3231 of the second sliding block 323. Actually, the tool is inserted into a polygonal hole 3311 of the head portion 331, and thus when the user rotates the tool, the tool can drive the first fixing member 33 to rotate, and the rod portion 332 can be rotated by its external thread along an internal thread of the threaded hole 3231 of the second sliding block 323. In this time, the first fixing member 33 can move toward inside of the perforation 11 or move toward outside of the perforation 11. When the first fixing member 33 moves toward the inside of the perforation 11, the head portion 331 can push the first sliding block 322 to move toward inside of the perforation 11, while the second sliding block 323 remains in place, such that the first sliding block 322 and the second sliding block 323 approach to each other and squeeze the clamping part 31, thereby the clamping part 31 moves in the direction toward the first aperture 21, and the clamping part 31 then squeezes the steering tube 4, such that the steering tube 4 is fixed in the first aperture 21. When the first fixing member 33 moves toward the outside of the perforation 11, the first sliding block 322 and the second sliding block 323 both remain in place. However, since the head portion 331 no longer abuts against the first sliding block 322, in this time, the first sliding block 322 and the second sliding block 323 no longer provide the squeezing force to the clamping part 31, and thus the clamping part 31 no longer provides the squeezing force to the steering tube 4, such that steering tube 4 can be detached from the first aperture 21.

In preferred embodiments, as shown in FIGS. 3 and 4, the locking device 30 further includes a gasket ring 34 sleeved at the rod portion 332 and abutting against the first sliding block 322 and the head portion 331. According to this, the gasket ring 34 can prevent a direct contact between the head portion 331 and the first sliding block 322, thereby reducing the wear between the head portion 331 and the first sliding block 322.

In preferred embodiments, as shown in FIGS. 2 to 4, one end of the perforation 11 is an open end 111, and another end of the perforation 11 is a closed end 112. The components of the locking device 30 are sequentially placed into the perforation 11 from the open end 111, while the closed end 112 can prevent the second sliding block 323 from escaping from the perforation 11 and avoid the loss of the second sliding block 323.

In preferred embodiments, as shown in FIGS. 1 to 5, the supporting structure 40 includes an extension part 41, a fixing part 42 and a plurality of second fixing members 43. The extension part 41 is integrally formed at the other end of the stem body 10 and a plurality of fixing holes 411 are disposed at a bottom of the extension part 41 (see FIG. 5). The fixing part 42 is provided with a plurality of through holes 421 penetrating the fixing part 42. An axis L1 of each of the fixing holes 411 is coaxial with an axis L2 of each of the through holes 421 and is perpendicular to a length direction of the stem body 10. The second fixing members 43 respectively pass through the through holes 421 and are fixed into the fixing holes 411, such that the fixing part 42 is fixed below the extension part 41. As shown in FIGS. 6 to 9, the fixing part 42 and the extension part 41 jointly fix the handlebar 6.

In more detail, each of the fixing holes 411 has an internal thread and thus is a threaded hole, each of the second fixing members 43 includes a head portion 431 and a rod portion 432, the rod portion 432 has an external thread, therefore each of the second fixing members 43 is a bolt. The extension part 41 is arc-shaped and has a recessed portion 412, and the fixing part 42 is arc-shaped and has a recessed portion 422. The recessed portion 412 and the recessed portion 422 correspond to each other and jointly form a second aperture 44. As shown in FIG. 9, after placing a middle section of the handlebar 6 into the second aperture 44, the rod portions 432 respectively pass through the through holes 421 and are fastened into the fixing holes 411, such that the fixing part 42 is fixed below the extension part 41, and the extension part 41 and the fixing part 42 jointly clamp the middle section of the handlebar 6, thereby the fixing part 42 and the extension part 41 jointly fix the handlebar 6, so as to achieve the effect of supporting the handlebar 6.

According to this, after the bottom of the extension part 41 and the top of the fixing part 42 abut against each other, the place where the fixing hole 411 communicates with the through hole 421 is completely hidden from view. In addition, the fixing part 42 does not penetrate the top of the extension part 41, only an opening of the through hole 421 at the bottom of the fixing part 42 is exposed, and the head portion 431 is closer to the bottom of the fixing part 42. Therefore, a bottom surface of the fixing part 42 is a locking surface. Since the locking surface at the bottom of the fixing part 42, the opening of the through hole 421 on the locking surface, and the head portion 431 of the first fixing member 43 are all located at the bottom of the fixing part 42, the user cannot see the locking surface, the opening of the through hole 421 on the locking surface and the head portion 431 of the first fixing member 43 when standing, thereby improving the aesthetic feeling of the stem 5.

Figure 10:
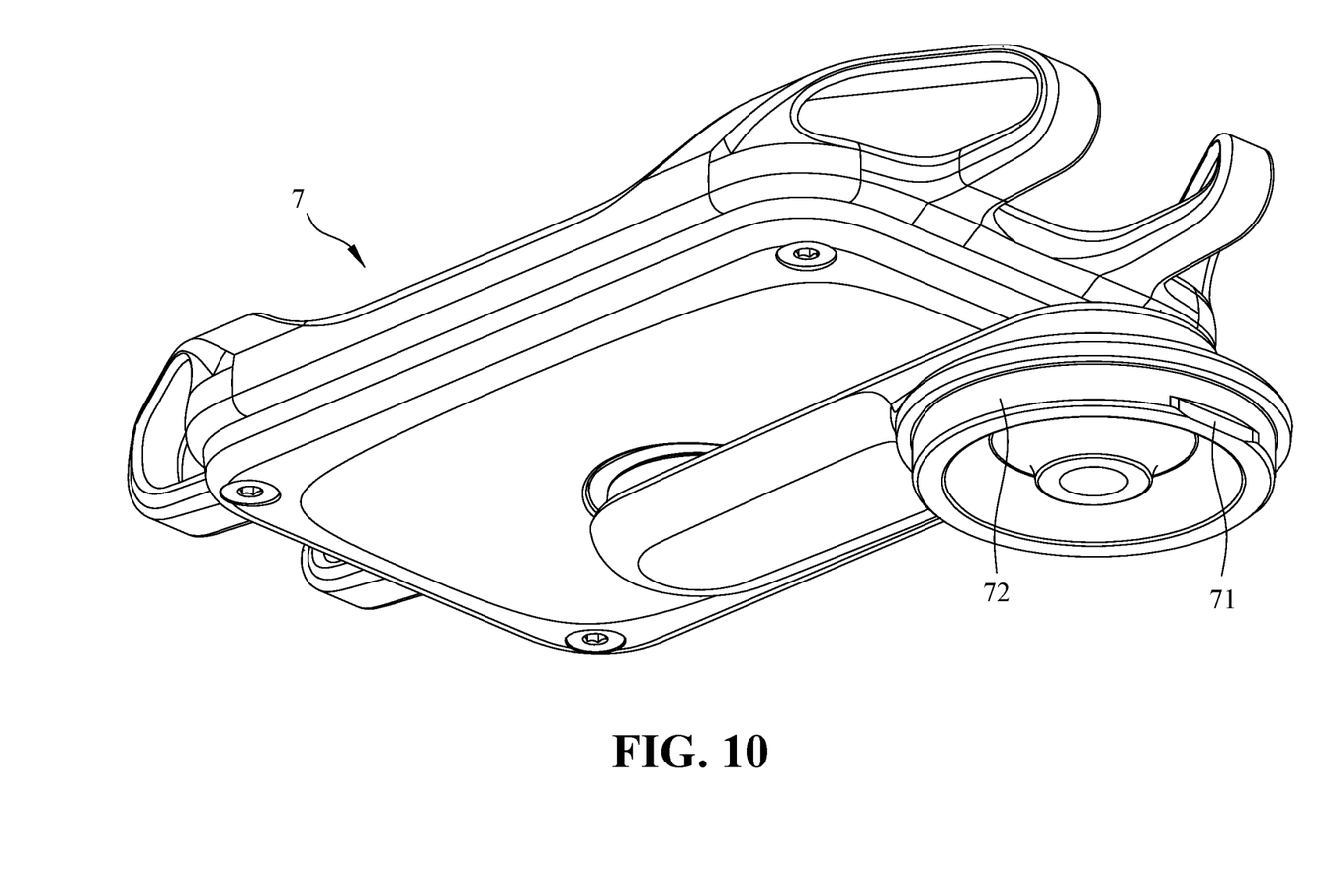
FIG. 10 is a perspective view of a mobile phone holder.
Figure 11:
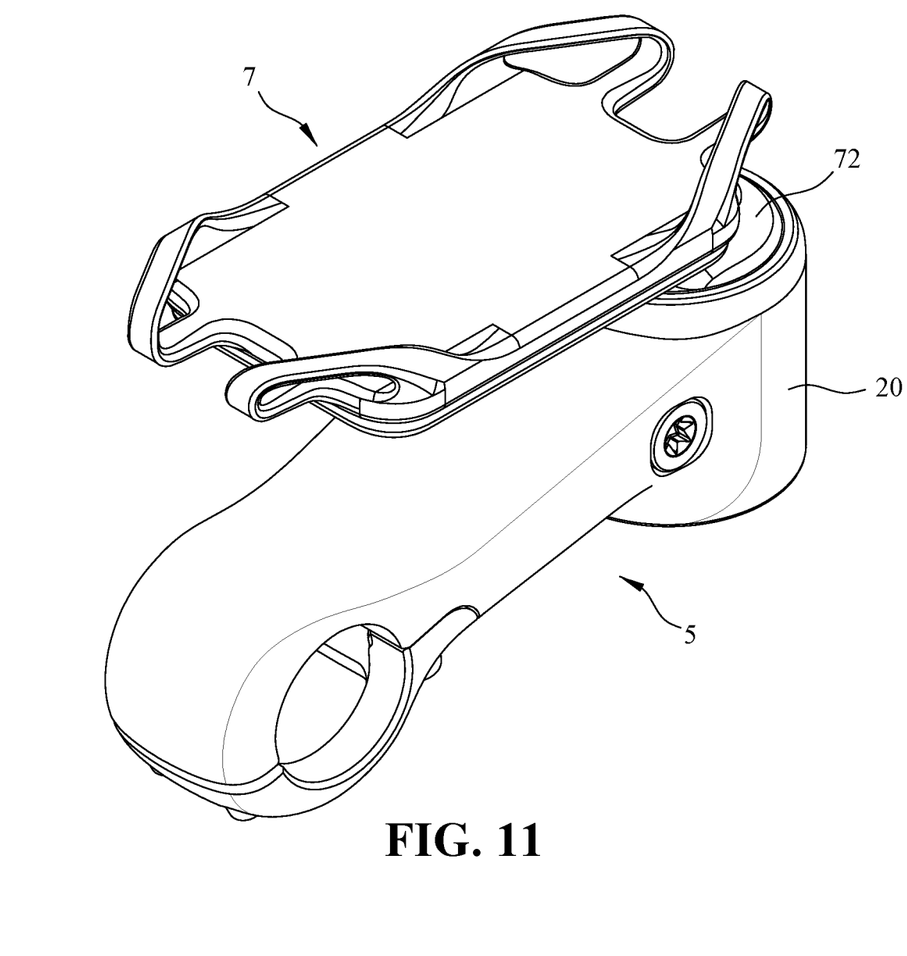
FIG. 11 is a perspective view illustrating the stem of the present invention snapped with a mobile phone holder.
Figure 12:
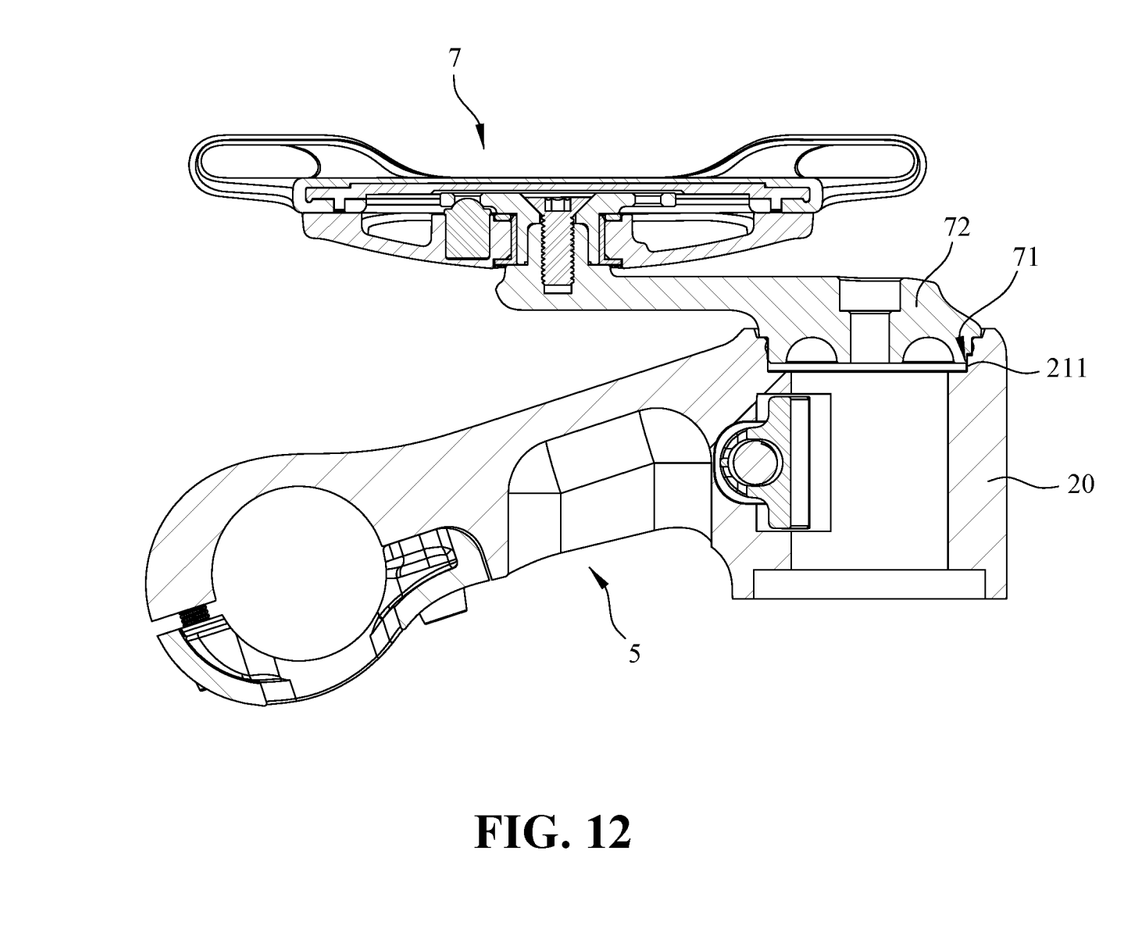
FIG. 12 is a cross-sectional view illustrating the stem of the present invention snapped with a mobile phone holder.

In preferred embodiments, as shown in FIGS. 1 and 2, a first engaging portion 211 is disposed on an inner sidewall of the first aperture 21. As shown in FIGS. 10 to 12, the first engaging portion 211 is used for engaging a second engaging portion 71 of an accessory 7 in the first aperture 21. In more detail, the first engaging portion 211 is a bump, while the second engaging portion 71 is a groove. In other embodiments, the first engaging portion 211 may also be a groove, while the second engaging portion 71 may also be a bump.

Preferably, as shown in FIG. 1, the first engaging portion 211 is closer to an opening at a top of the first aperture 21 than to an opening at a bottom of the first aperture 21. Therefore, the accessory 7 can be quickly mounted on the column 20 or detached from the column 20.

Preferably, as shown in FIG. 10, the accessory 7 is provided with a base 72, a shape of the base 72 matches a shape of the opening at a top of the first aperture 21, and the second engaging portion 71 is disposed on an outer sidewall of the base 72. Therefore, as shown in FIG. 12, the accessory 7 can allow the second engaging portion 71 to snap with the first engaging portion 211 from a direction with an inclined angle. The accessory 7 can be detached from the column 20 with a reverse operation.

The accessory 7 shown in FIGS. 10 to 12 is a mobile phone holder. In other embodiments, the accessory 7 can also be an item suitable for being mounted on the stem 5, such as bicycle light, stopwatch, dash cam, navigator, display screen, or action camera.

According to this, in the present invention, since the accessory 7 can be fixed on the column 20 without any fixing member, the assembly and disassembly procedures of the present invention are quite simple and easy to operate.

Further, there is not any locking surface on the column 20, which improves the aesthetic feeling of the stem 5.

The mentioned above are only preferred embodiments for explaining the present invention but intend to limit the present invention in any forms, so that any modifications or verification relating to the present invention made in the same spirit of the invention should still be included in the scope of the invention as intended to be claimed.

What is claimed is:

1. A stem, comprising:
    a stem body provided with a perforation;
    a column, which is disposed at one end of the stem body and provided with a first aperture, the perforation is in communication with the first aperture, a first engaging portion is a bump and disposed on an inner sidewall of the first aperture;
    a locking device, which is disposed in the perforation and includes a clamping part, two sliding blocks and a first fixing member, the clamping part is located between the sliding blocks, and the first fixing member penetrates the clamping part and the sliding blocks; and
    an accessory, which is provided with a second engaging portion, the second engaging portion is a groove and engaged with the first engaging portion; and
    wherein, when the first fixing member moves toward the inside of the perforation, the first fixing member drives the sliding blocks to approach each other and squeeze the clamping part, such that the clamping part moves in a direction toward the first aperture.

2. The stem according to claim 1, wherein the first engaging portion is closer to an opening at a top of the first aperture than to an opening at a bottom of the first aperture.

3. The stem according to claim 1, wherein a side of the clamping part facing the first aperture is recessed inwardly to form an arc surface.

4. The stem according to claim 1, wherein the sliding blocks are respectively defined as a first sliding block and a second sliding block, the first fixing member is a bolt, and the first fixing member sequentially passes through the first sliding block and the clamping part and is fastened into the second sliding block.

5. The stem according to claim 1, wherein the sliding blocks are respectively defined as a first sliding block and a second sliding block; the first fixing member includes a head portion and a rod portion; the rod portion sequentially passes through the first sliding block and the clamping part and is fixed into the second sliding block; and the locking device further includes a gasket ring sleeved at the rod portion and abutting against the first sliding block and the head portion.

6. The stem according to claim 1, wherein one end of the perforation is an open end, and another end of the perforation is a closed end.

7. The stem according to claim 1, further comprising a supporting structure including an extension part, a fixing part and at least one second fixing member; wherein the extension part is disposed at another end of the stem body and at least one fixing hole is disposed at a bottom of the extension part; the fixing part is provided with at least one through hole penetrating the fixing part; an axis of the at least one fixing hole is coaxial with an axis of the at least one through hole and is perpendicular to a length direction of the stem body; and the at least one second fixing member passes through the at least one through hole and is fixed into the at least one fixing hole, such that the fixing part is fixed below the extension part.

8. The stem according to claim 1, wherein each sliding block has a side that faces the other sliding block and each of the facing sides forms a squeezing surface, respectively; the clamping part has two sides that form a contact surface; and the contact surfaces abut against the squeezing surfaces, respectively.

9. The stem according to claim 8, wherein extending directions of the squeezing surfaces are different from each other, and a distance between the squeezing surfaces increases in the direction toward the first aperture.

10. The stem according to claim 9, wherein at least one of the squeezing surfaces is an inclined surface or an arc surface.

11. The stem according to claim 9, wherein the squeezing surfaces are both inclined surfaces or arc surfaces.

12. The stem according to claim 8, wherein extending directions of the contact surfaces are different from each other, and a distance between the contact surfaces increases in the direction toward the first aperture.

13. The stem according to claim 12, wherein at least one of the contact surfaces is an inclined surface or an arc surface.

14. The stem according to claim 12, wherein the contact surfaces are both inclined surfaces or arc surfaces.

15. The stem according to claim 8, wherein extending directions of the squeezing surfaces are different from each other, and a distance between the squeezing surfaces increases in the direction toward the first aperture; the squeezing surfaces are both inclined surfaces or arc surfaces; extending directions of the contact surfaces are different from each other, and a distance between the contact surfaces increases in the direction toward the first aperture; the contact surfaces are both inclined surfaces or arc surfaces; and shapes of the squeezing surfaces match the shapes of the contact surfaces, respectively.

16. A bicycle, comprising:
a bicycle body; and
a steering assembly, including:
a steering tube rotatably disposed on the bicycle body;
a stem, which includes a stem body, a column, a locking device, a supporting structure and an accessory; the stem body is provided with a perforation; the column is disposed at one end of the stem body and provided with a first aperture, the perforation is in communication with the first aperture, a first engaging portion is a bump and disposed on an inner sidewall of the first aperture; the column is sleeved at the steering tube such that the steering tube is located in the first aperture; the locking device is disposed in the perforation and includes a clamping part, two sliding blocks and a first fixing member, the clamping part is located between the sliding blocks, and the first fixing member penetrates the clamping part and the sliding blocks; and the supporting structure is disposed at another end of the stem body; the accessory is provided with a second engaging portion, the second engaging portion is a groove and engaged with the first engaging portion; and wherein, when the first fixing member moves toward the inside of the perforation, the first fixing member drives the sliding blocks to approach each other and squeeze the clamping part, such that the clamping part moves in a direction toward the first aperture, the clamping part thereby squeezes the steering tube such that the steering tube is fixed in the first aperture; and
a handlebar disposed in the supporting structure.

17. The bicycle according to claim 16, wherein the supporting structure includes an extension part, a fixing part and at least one second fixing member; the extension part is disposed at the other end of the stem body and at least one fixing hole is disposed at a bottom of the extension part; the fixing part is provided with at least one through hole penetrating the fixing part; an axis of the at least one fixing hole is coaxial with an axis of the at least one through hole and is perpendicular to a length direction of the stem body; and the at least one second fixing member passes through the at least one through hole and is fixed into the at least one fixing hole, such that the fixing part is fixed below the extension part; and the fixing part and the extension part jointly fix the handlebar.

* * * * *